US008151946B2

(12) United States Patent
Doleschel et al.

(10) Patent No.: US 8,151,946 B2
(45) Date of Patent: Apr. 10, 2012

(54) ROTOR BRAKE FOR A ROTARY-WING AIRCRAFT

(75) Inventors: Andreas Doleschel, Grosshelfendorf (DE); Peter Konstanzer, Taufkirchen (DE)

(73) Assignee: Eurocopter Deutschland GmbH, Donauwoerth (DE)

( * ) Notice: Subject to any disclaimer, the term of this patent is extended or adjusted under 35 U.S.C. 154(b) by 805 days.

(21) Appl. No.: 12/100,741

(22) Filed: Apr. 10, 2008

(65) Prior Publication Data

US 2008/0277213 A1 Nov. 13, 2008

(30) Foreign Application Priority Data

Apr. 10, 2007 (DE) .................. 10 2007 017 107

(51) Int. Cl.
*F16D 55/22* (2006.01)
(52) U.S. Cl. .................. 188/72.4; 188/72.3; 60/481
(58) Field of Classification Search ............... 188/71.1, 188/72.1, 72.3, 72.4, 355; 416/32, 169 A; 415/123; 60/481, 477
See application file for complete search history.

(56) References Cited

U.S. PATENT DOCUMENTS

| 3,228,195 | A  | * | 1/1966  | Brent et al. ............... 60/578 |
| 4,327,414 | A  |   | 4/1982  | Klein et al. |
| 4,344,743 | A  | * | 8/1982  | Bessman et al. ........... 417/317 |
| 5,462,137 | A  | * | 10/1995 | Aubry et al. ............... 188/72.6 |
| 5,826,683 | A  |   | 10/1998 | Murata et al. |
| 6,077,042 | A  |   | 6/2000  | Pancotti et al. |
| 6,328,388 | B1 |   | 12/2001 | Mohr et al. |
| 7,168,533 | B2 |   | 1/2007  | Podratzky et al. |
| 2005/0058536 | A1 | * | 3/2005 | Podratzky ............... 415/123 |
| 2008/0011577 | A1 | * | 1/2008 | Burkhart et al. ........ 192/85 R |

FOREIGN PATENT DOCUMENTS

| DE | 2926017   |   | 2/1981 |
| DE | 69208207  |   | 9/1996 |
| DE | 19542657  |   | 5/1997 |
| DE | 19703230  |   | 7/1997 |
| DE | 10127444  |   | 4/2002 |
| DE | 69810025  | T | 7/2003 |
| DE | 10343055  |   | 5/2005 |

OTHER PUBLICATIONS

A. Podratzky et al., "Die Rotorbremsen der Hubschrauber BO105, EC135, EC145 und Tiger", DGLR-2004-085, pp. 1563-1573.

* cited by examiner

*Primary Examiner* — Robert A Siconolfi
*Assistant Examiner* — Anna Momper
(74) *Attorney, Agent, or Firm* — Brooks Kushman P.C.

(57) ABSTRACT

A rotor brake for a rotary-wing aircraft includes a rotor shaft, a braking-force actuator configured to be hydraulically actuated, a braking-force pick-up element connected to the rotor shaft and operationally connected to the braking-force actuator, an electromechanical piston control element, and a first hydraulic line connecting the electromechanical piston control element to the braking-force actuator so that the braking-force actuator can be actuated electrohydraulically by the electromechanical piston control element.

11 Claims, 2 Drawing Sheets

ROTOR BRAKE FOR A ROTARY-WING AIRCRAFT

Priority is claimed to German Patent Application No. 10 2007 017 107.4, filed on Apr. 10, 2007, the entire disclosure of which is incorporated by reference herein.

The present invention relates to a rotor brake for a rotary-wing aircraft.

BACKGROUND

When it comes to rotary-wing aircraft, especially to helicopters, the rotating wings, that is to say, the rotors, have to be braked after the landing on the ground. The rotating wings have to be braked and secured when the aircraft is parked so that they cannot turn, for example, if it is windy. Rotor brakes are needed to achieve this non-rotating state.

German patent specification DE 698 10 025 T2 discloses a rotor brake for a helicopter for purposes of quickly bringing the rotor to a standstill after the landing. This is done mechanically, for instance, with brake calipers.

German patent specification DE 692 08 207 T2 describes a braking unit for use in a rotary-wing aircraft. This unit is designed to stop the rotor as soon as the aircraft has touched the ground. In this context, the phase from the slowdown to the standstill of the rotor should be as short as possible. This is intended to reduce the risk that a blast of wind might cause the rotor disk to tilt so that the rotor could strike passengers just as they are leaving the aircraft, before the rotor has come to a complete standstill. The proposed braking device comprises a hydraulic control motor with a braking force amplifier. The hydraulic control motor encompasses a motor piston that is directly connected to a mechanical transmission means, a free piston that acts upon a friction lining and that has a larger cross section than the motor piston, as well as a control chamber that is formed in a support member between the motor piston and the free piston.

German patent application DE 103 43 055 A1 discloses a rotor brake comprising a brake disk non-rotatingly joined to the rotor shaft, a stationary brake actuator for actuating the brake disk that can be functionally coupled to the brake disk in order to exert a braking effect, and at least one rotor-brake deactivation device that is controlled by the rotor speed and actuated by centrifugal force. The brake actuator is connected to a hydraulic line that supplies the pressure. A piezoelectric actuator can be used instead of the brake actuator.

German patent application DE 101 27 444 A1 discloses a piezoelectric mechanism for generating braking forces, having a number of piezoelectric stepping-drive elements. This mechanism is supposed to refine the principle of a piezoelectric drive so as to yield a practical construction optimized for use as a brake drive or servo drive. In this context, the stepping-drive elements act on the outer circumference of a driven part configured as a threaded spindle.

SUMMARY OF THE INVENTION

An aspect of the present invention is to refine a rotor brake for a rotary-wing aircraft in such a way that, on the one hand, it is easy to control the rotor brake and, on the other hand, its design can be kept compact.

The present invention provides a rotor brake for a rotary-wing aircraft that includes an electromechanical piston control element that is connected to a braking-force actuator via a hydraulic line, so that the braking-force actuator is configured in such a way that it can be actuated electrohydraulically by the electromechanical piston control element.

The electrically actuatable system according to the invention eliminates the need for mechanical and hydraulic control and supply lines. The invention creates a closed system which, with a local hydraulic unit, is also very low-maintenance. The solution with the electromechanical piston control element has a very low power requirement. This is necessary since, in actual practice, the aircraft engine is normally already switched off, so that only electric power from an on-board battery is available.

The construction according to the invention also allows the rotor brake to have a very compact structure. This is achieved essentially through the elimination of the mechanical and hydraulic control and supply lines and of the additional weight associated with these.

According to an embodiment of the invention, the electromechanical piston-control element comprises a piezoelectric element for moving the piston.

Through the use of a piezoelectric element, the braking force can be dosed very well since the piezoelectric element, preferably made of piezoceramic, can be actuated with great precision. The fact that the braking force can be dosed very well also means that it is possible to stay within the mechanical load limit of the rotor brake, thus preventing it from being damaged.

In particular, the piezoelectric element works together with a piezoelectric amplifier and is configured so that it can be controlled via the piezoelectric amplifier.

It is advantageous for the piston control element to be configured as a pump drive having a pump housing and a pump piston. This configuration means that the piston only has to move within a range from a few tenths of a millimeter to a few millimeters since a number of pump cycles can be performed to effectuate the motion. As a result of the accumulated pump cycles, the braking force can be dosed very precisely. Since the travel speed of the brake piston can be relatively low, the pump only has to convey small volume flows and consequently can have a compact and lightweight design.

In a practical manner, the pump housing of the piston control element is connected to a first and a second hydraulic line. Here, the first hydraulic line is fitted with an inlet valve and the second hydraulic line with an outlet valve. Both hydraulic lines are still connected to the hydraulic line of the braking-force actuator. Thanks to this pump-valve solution, sufficient braking force can be achieved without the need to consume electric power, for example, when the aircraft is parked. The braking effect is achieved practically without electric energy.

According to another embodiment, a valve that releases the braking-force actuator is provided in a segment of the hydraulic line leading to the braking-force actuator between the first and second hydraulic lines of the piston control element.

Advantageously, the valve can be actuated by a relay so that the valve is opened and the rotor brake is released in the case of a voltage drop.

The hydraulic line leading to the braking-force actuator is connected to a brake fluid reservoir.

The braking-force actuator preferably comprises a brake-cylinder housing in which a brake piston is movably mounted. On the side facing the braking-force pick-up element, the brake piston is provided with a brake pad for the braking-force pick-up element.

In particular, a return spring that acts between the brake piston and the brake-cylinder housing engages with the brake piston.

A simple construction is also ensured in that the braking-force pick-up element is configured as a brake disk.

The rotor brake here is used especially in a rotary-wing aircraft, for example, a helicopter.

Additional advantages, features and application possibilities of the rotor brake for rotary-wing aircraft can be gleaned from the description below in conjunction with an embodiment depicted in the drawing.

BRIEF DESCRIPTION OF THE DRAWINGS

The invention will be described in greater detail below with reference to the embodiment depicted in the drawing. The terms and appertaining reference numerals compiled in the list of reference numerals below are employed in the description, in the patent claims, in the abstract and in the drawing. The drawing shows the following:

DETAILED DESCRIPTION

Figure 1:
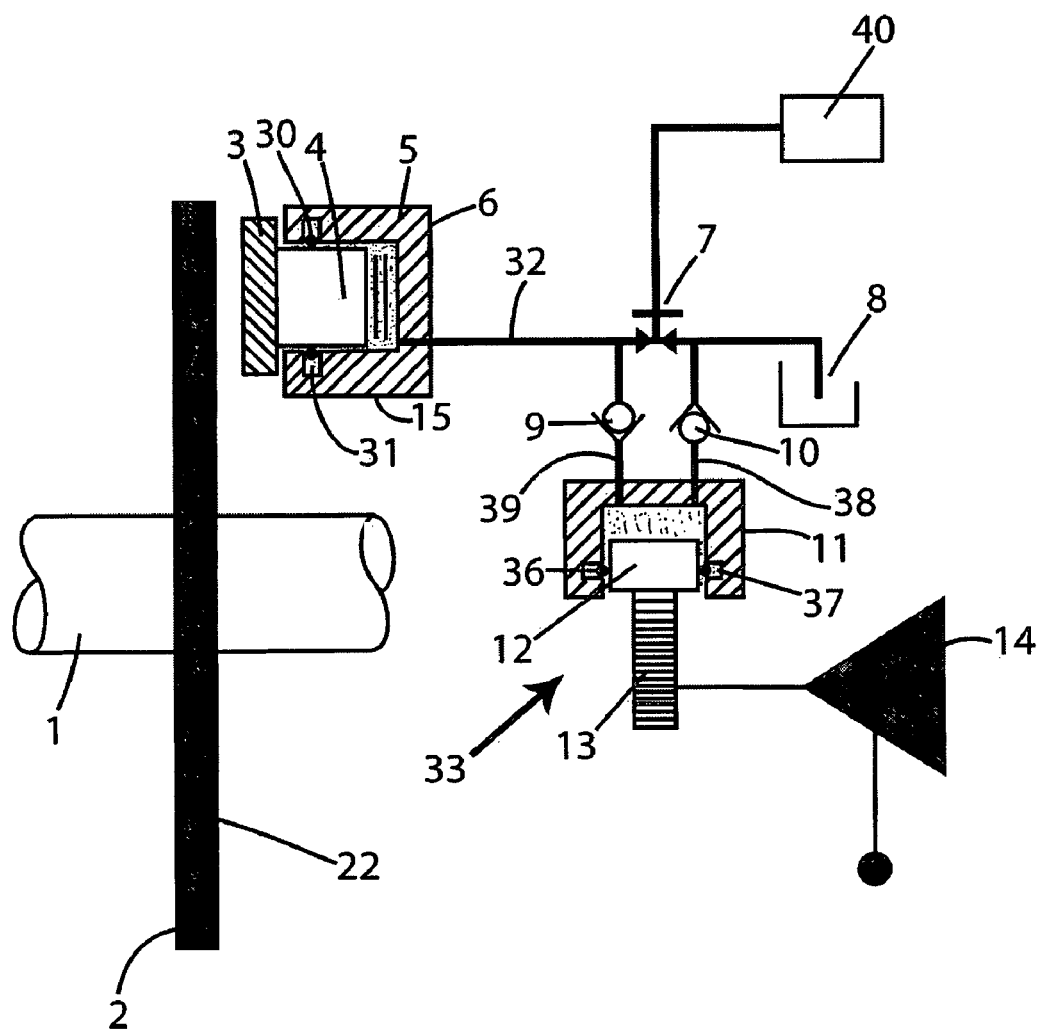
FIG. 1—a schematic diagram of a preferred embodiment of a piezohydraulic rotor brake.

FIG. 1 shows a preferred embodiment of a rotor brake according to the invention. It is preferably configured for a rotary-wing aircraft, especially for a helicopter. The rotor brake comprises a braking-force pick-up element 2 that is especially configured as a brake disk 2. A braking-force actuator 15 is operationally connected to the brake disk 2 that is connected to a rotor shaft 1.

The braking-force actuator 15 is provided with a brake pad 3, with a brake piston 4 that supports the brake pad 3, and with a brake cylinder or brake-cylinder housing 6 through which the brake piston 4 runs. Between the brake piston 4 and the brake-cylinder housing 6, there is a sealing element 30 that is located, for example, in a groove 31 of the housing 6.

The brake piston 4 is movably mounted inside the brake-cylinder housing 6. The brake-cylinder housing 6 is connected to a hydraulic line 32. The pressure in the brake-cylinder housing 6 can be raised via the hydraulic line 32 so that the brake piston 4, along with the brake pad 3, is moved in the direction of a braking surface 22 of the brake disk 2. If the pressure in the brake-cylinder housing 6 drops, a recovery spring 5 causes the brake piston 4, along with the brake pad 3, to be moved back, so that the braking effect is suspended and the rotor brake is released.

An electromechanical piston control element 33 that hydraulically actuates the braking-force actuator 15 serves to raise the pressure in the brake-cylinder housing 6. Therefore, the braking-force actuator 15 is connected via the hydraulic line 32 to the braking-force actuator 15.

In the preferred embodiment shown in the figures, the electromechanical piston control element 33 is configured as a piezoelectric control element. This element comprises a piezoelectric element 13 that, as a piezoelectric actuator, causes the piston to move.

Here, the piston control element 33 has a pump housing 11 and a pump piston 12 that is movably mounted inside the pump housing 11. An additional sealing element 36 situated in a groove 37 of the pump housing 11 is provided in order to seal off the pump piston 12 vis-à-vis the pump housing 11.

The piston control element 33 is configured as a pump drive. For this purpose, two hydraulic lines 38 and 39 are connected to the pump housing 11.

An inlet valve 10 is installed in the hydraulic line 38 so that brake fluid from a brake fluid reservoir 8 can be picked up when the pump piston 12 executes a backward motion. The inlet valve 10 is automatically closed when the pump piston 12 executes a forward motion. In this process, the outlet valve 9 installed in the second hydraulic line 39 opens. The pump piston 12 then pumps brake fluid out of the pump housing 11 into the brake-cylinder housing 6. As a result, owing to the pressure increase in the brake-cylinder housing 6, the brake piston 4, along with the brake pad 3, moves towards the braking surface 22 of the brake disk 2. In order to do so, the force of the recovery spring 5 is overcome.

Figure 2:
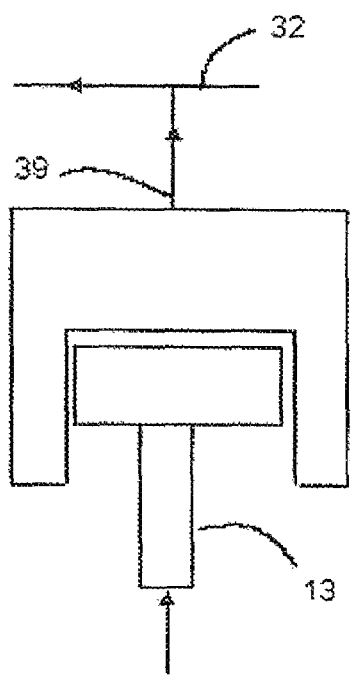
FIG. 2—a schematic diagram of the piezoelectric pump according to FIG. 1 in a forward motion.
Figure 3:
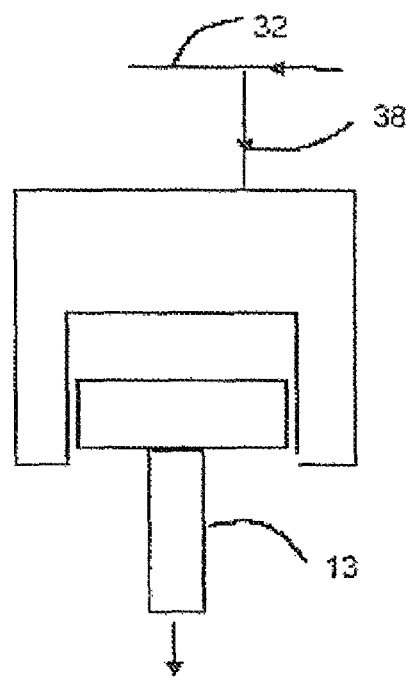
FIG. 3—a schematic diagram of the piezoelectric pump in a backward motion.

FIGS. 2 and 3 depict the piston control element 33 in different states. This serves to illustrate the pump cycles of the piston control element 33 and thus the motions executed by the pump piston 12 in the pump housing 11. For the sake of clarity, only the active hydraulic line 38 or 39 is shown in each case.

FIG. 2 shows how the pump piston 12 moves in the direction of the hydraulic line 39, thus pumping brake fluid in the direction of the hydraulic line 32 via the hydraulic line 39. Consequently, the hydraulic line 39 is active. FIG. 3 shows the state when the pump piston 12 is moved back. Line 38 is then active. By means of several such pump cycles, the pressure in the brake-cylinder housing 6 can be successively raised, so that the motion of the brake piston 4 can be dosed very precisely. As a result, the braking force can be adjusted with great precision. The piezoelectric element 13, as the actuator for the drive of the pump piston 12, is connected to a piezoelectric amplifier 14 that can bring about a high tension and thus a relatively large stroke in the piezoelectric element 13.

In order to release the braking effect, a valve 7 is advantageously installed in the hydraulic line 32. This valve interacts with a relay 40. The valve 7 is controlled by means of the relay 40. When the valve 7 is opened, the brake fluid flows back into the brake fluid reservoir 8. The rotor brake is thus released.

The piezoelectric amplifier 14 can be controlled by electric signals. As a consequence, only electric control lines are needed to actuate the rotor brake. Hydraulic control lines can thus be dispensed with.

The piezoelectric element 13 can either be provided with a recovery spring or else it can be controlled by negative and positive voltages, so that a forward motion and a backward motion are possible.

The piezoelectric element 13 can also be controlled by square-wave signals, sinusoidal signals or other signals.

What is claimed is:

1. A rotor brake for a helicopter, the rotor brake comprising:
   a braking-force actuator;
   a brake fluid reservoir;
   a first hydraulic line connecting the braking-force actuator and the reservoir;
   an electromechanical piston control element having a piezoelectric element, a piezoelectric amplifier, and a pump piston, wherein the piezoelectric element is controllable by the piezoelectric amplifier and is configured to move the pump piston, the electromechanical piston control element connected to the first hydraulic line using a second hydraulic line and a third hydraulic line between the braking force actuator and the brake fluid reservoir, the second hydraulic line having an inlet valve and the third hydraulic line having an outlet valve; and
   a release valve positioned in the first hydraulic line and interposed between the second and third hydraulic lines;
   wherein the electromechanical piston control element electrohydraulically actuates the braking-force actuator via the first hydraulic line by the piezoelectric element moving the pump piston in accordance with control from the piezoelectric amplifier; and wherein the hydraulic line is configured for bidirectional flow of a brake fluid, where the first hydraulic line is configured such that the brake fluid flows in a first direction through the hydraulic line when actuating the braking-force actuator, and the brake fluid flows in a second direction through the first hydraulic line when releasing the braking-force actuator.

2. The rotor brake as recited in claim 1, wherein the piston control element further includes a pump drive having a pump housing and the pump piston.

3. The rotor brake as recited in claim 1, further comprising a relay configured to actuate the valve.

4. The rotor brake as recited in claim 1, wherein the piezoelectric element includes piezoceramic.

5. A rotor brake for a rotary-wing aircraft, comprising:

a braking-force pick-up element linked to a rotor shaft; said braking-force pick-up element being operationally connected with a braking-force actuator, said braking-force actuator being configured to be hydraulically actuated;

an electromechanical piston control element connected by means of a first hydraulic line to the braking-force actuator, so that the braking-force actuator can be actuated electro-hydraulically by the control element, the control element is connected to a second hydraulic line and a third hydraulic line, an inlet valve provided in the second hydraulic line and an outlet valve provided in the third hydraulic line, wherein the second and third hydraulic lines are connected to the first hydraulic line of the braking-force actuator, wherein one segment of the first hydraulic line leading towards the braking-force actuator has a valve positioned between the second hydraulic line and the third hydraulic line of the control element for release of the braking-force actuator; and a brake fluid reservoir connected to the first hydraulic line;

wherein the first hydraulic line is configured such that a brake fluid flows through the first hydraulic line in a first direction when the braking-force actuator is actuated, and the brake fluid flows through the first hydraulic line in a second direction when the braking-force actuator is released.

6. The rotor brake as recited in claim 5, wherein the piston control element further includes a pump drive having a pump housing and the pump piston.

7. The rotor brake as recited in claim 5, further comprising a relay configured to actuate the valve.

8. The rotor brake as recited in claim 5, further comprising a brake fluid reservoir connected to the first hydraulic line.

9. The rotor brake as recited in claim 5, wherein the braking-force pick-up element includes a brake disk.

10. A method of braking a rotor of a rotary-wing aircraft having a rotor shaft, the method comprising:

providing a braking-force actuator connected to a braking fluid reservoir using a first hydraulic line;

connecting a braking-force pick-up element to the rotor shaft and the braking-force actuator;

connecting an electromechanical piston control element to the first hydraulic line using a second and a third hydraulic line, an inlet valve provided in the second hydraulic line and an outlet valve provided in the third hydraulic line, and providing a release valve in one segment of the first hydraulic line between the second hydraulic line and the third hydraulic line for release of the braking-force actuator;

actuating the braking force actuator electrohydraulically using the electromechanical piston control element, thereby causing a braking fluid to flow through the first hydraulic line in a first direction; and releasing the braking force actuator using the release valve, thereby causing the braking fluid to flow through the first hydraulic line in a second direction.

11. The method as recited in claim 10, wherein the rotary-wing aircraft is a helicopter.

* * * * *